US005200779A

United States Patent [19]

Nawata

[11] Patent Number: 5,200,779
[45] Date of Patent: Apr. 6, 1993

[54] IMAGE FORMING APPARATUS WITH MAINTENANCE PROCEDURE

[75] Inventor: Yoshiaki Nawata, Yokohama, Japan

[73] Assignee: Kabushiki Kaisha Toshiba, Kawasaki, Japan

[21] Appl. No.: 711,074

[22] Filed: Jun. 6, 1991

[30] Foreign Application Priority Data

Jun. 8, 1990 [JP] Japan .................................. 2-148480

[51] Int. Cl.[5] .............................................. C03G 15/00
[52] U.S. Cl. .................................... 355/206; 355/207; 355/209
[58] Field of Search .......................... 355/200, 204–209

[56] References Cited

U.S. PATENT DOCUMENTS 4,699,501 10/1987 Watanabe et al. .................. 355/200
4,799,081 1/1989 Kikuno et al. ...................... 355/209
4,870,459 9/1989 Ito et al. .............................. 355/209

FOREIGN PATENT DOCUMENTS 61-196264 8/1986 Japan .................................. 355/207
63-249156 10/1988 Japan .................................. 355/210

*Primary Examiner*—Joan H. Pendegrass
*Attorney, Agent, or Firm*—Foley & Lardner

[57] ABSTRACT

A copying machine including an image forming section, a control unit, and memory means. The control unit has a memory storing data for controlling the image forming section. The memory means stores maintenance data which is generated every time said image forming means is operated and which represents maintenance items to be performed on the image forming section. When the machine is set in maintenance mode, the data is read from the memory. At the same time, at least one of the components of said image forming section, which needs to be replaced by a new one, is selected in accordance with the data stored in the memory means. The selected component is locked at a desired position, thereby to facilitate the replacing of the selected component and to reduce the time and cost required for maintenance work.

7 Claims, 6 Drawing Sheets

IMAGE FORMING APPARATUS WITH MAINTENANCE PROCEDURE

BACKGROUND OF THE INVENTION

1. Field of the Invention

This invention relates to an image forming apparatus, and more specifically to an electrostatic type copying machine having a photoconductor and designed to copy an optical pattern image which is the information formed on an object, by forming on the photoconductor a latent image corresponding to the image, rendering the latent image visible, and electrostatically transferring the visible image from the photoconductor to recording material.

2. Description of the Related Art

Most electrostatic type copying machines have a photoconductor, a developing mechanism, a material delivering mechanism, and a cleaning unit. A latent image of the optical pattern image of the object is formed on the photoconductor. The developing mechanism supplies developer (generally known as "toner") to the photoconductor, thereby developing the latent image into a visible one. The material delivering mechanism supplies the recording material, such as a sheet of paper. The image is electrostatically transferred from the photoconductor to the recording material to make a hard copy. The cleaning unit removes the residual developer from the photoconductor.

In order to transfer the image from the photoconductor to the recording material, a voltage as high as several kilovolts is applied to the photoconductor, thus electrically charging the photoconductor. The photoconductor is discharged upon each completion of transferring an image from the photoconductor to a sheet of paper. Hence, the photoconductor is repeatedly charged and discharged as the image is copied many times. As is known in the art, the more times the photoconductor is charged and discharged, the more its charge-discharge readiness will be deteriorate. It is also known that the cleaning unit is likely to scratch the surface of the photoconductor when it is pressed onto the photoconductor to remove the residual toner therefrom after the visible image has been transferred to the sheet of paper.

Therefore, it is necessary to periodically replace the photoconductor with a new one. Also it is necessary to adjust, occasionally, the pressure at which the cleaning unit is pressed onto the photoconductor to remove the residual developer. In other words, trained servicemen often need to do maintenance on the copying machine.

A serviceman is called when the user of the copying machine finds that the machine does not work well. It is virtually impossible for the user to point out to the serviceman, precisely and correctly, what is the trouble with the machine or where in the machine the trouble is happening, because the user does not know much about the copying machine. In most cases, it takes the serviceman a considerably long time to determine the trouble and repair the machine to eliminate the trouble.

The periodic maintenance of the copying machine also requires some time. When trouble is found in the machine, more time is required to eliminate the trouble. Even if the trouble is small, the serviceman needs to spend much time to fix it if he or she has not repaired or inspected this particular copying machine.

No matter whether the serviceman examines and repairs the machine at the request of the user, or performs periodic maintenance on the machine, the copying machine is left unusable for a long period of time. This obviously jeopardizes not only the operating efficiency of the copying machine, but also the reliability of the machine.

SUMMARY OF THE INVENTION

It is an object of this invention to provide an image forming apparatus which can inform a serviceman of any component which needs maintenance or repair, precisely and correctly.

It is another object of the invention to provide an image forming apparatus which can teach a serviceman the most recommended order of maintenance steps.

According to an aspect of the present invention, there is provided an image forming apparatus comprising means for forming an image on an image bearing member, first memory means for storing control data to control the image forming means, second memory means for storing maintenance data at a time the image forming means is operated, the maintenance data representing maintenance items which are performed on the image forming means, and means for controlling the image forming means both the controlling data stored in the first memory means and the maintenance data stored in the second memory means.

According to another aspect of the invention, there is provided an image forming apparatus which comprises:

image forming means having display means for displaying data a user needs and designed to copy information formed on an object in the form of an optical image;

memory means for storing maintenance data generated every time the image forming means is operated, said maintenance data representing maintenance items which should be performed on the image forming means when the apparatus is set in maintenance mode; and control means for controlling the image forming means and causing the display means to display the maintenance data stored in the memory means when the apparatus is set in the maintenance mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will now be described, with reference to the accompanying drawings.

Figure 1:
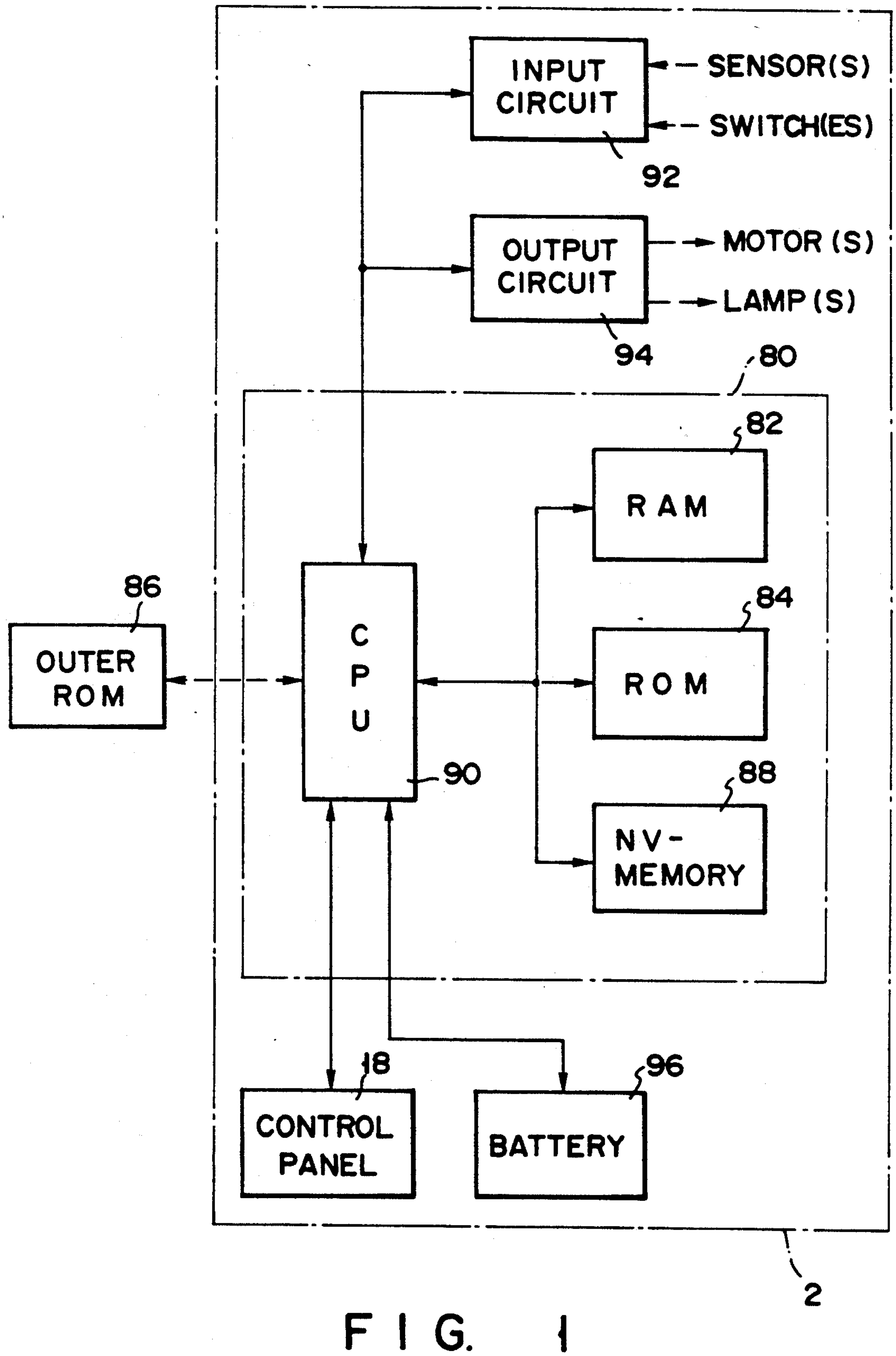
FIG. 1 is a block diagram schematically showing the electrical connection of the components of a copying machine according to the present invention.

FIG. 1 schematically illustrates a copying machine 2 according to the invention. As is shown in FIG. 1, the copying machine includes a control panel 18, a control unit 80, an outer ROM 86, an input circuit 92, an output circuit 94, and a battery 96. The control unit 80 includes a RAM 82, a ROM 84, and a nonvolatile (NV) memory 88, and a CPU 90.

The CPU 90 controls the components of the machine 2, other than the control unit 80. The RAM 82 is used to store data, representing, for example, the number of copies desired, the magnification at which to copy information, and other items of data required in copying information. The ROM 84 scores for example, the data representing the initializing sequence of the copying machine 2, the data representing the control sequence of the lamp incorporated in a fixing unit (later described), an other items of data representing similar control sequences. The nonvolatile memory 88 is continuously supplied with electric power from a back-up power supply, such as an Li battery or an Ni-Cd battery, once the copying machine 2 has been installed. Hence, the memory 88 stores the data representing the number of copies made to this date, the data showing the amount of developer used thus far, the data representing the number of copies made since the last replacement of a photoconductor 40 (later described), and other items of the use-history data of the copying machine 2. The nonvolatile memory 88 can be replaced by one which requires no back-up power supply.

The outer ROM 86 is an IC card, a ROM cartridge, or the like, electrically connected to the CPU 90 of the control unit 80. It can be disconnected from the CPU 90. The outer ROM 86 stores a maintenance program for adjusting a main charging device 42 (later described), the pressure at which to press the blade (not shown) of a cleaning unit 48 (later described) onto the photoconductor, and other maintenance items.

The copying machine 2 has various sensors and switches (not shown). These sensors and switches are connected to the CPU 90. Also, a lamp 22 (later described), a fixing heater lamp (not shown), and motors (not shown, either) are connected to the input circuit 94, which in turn is connected to the CPU 90. The control panel 18 is connected by an interface (not shown) to the CPU 90. The battery 96 is also connected to the CPU 90. The battery 96 has a capacity large enough to energize the control panel 18 which includes LCDs 18*e* and 18*f* (later described). It can be a secondary battery, and serves as back-up battery for the nonvolatile memory 88.

Figure 2:
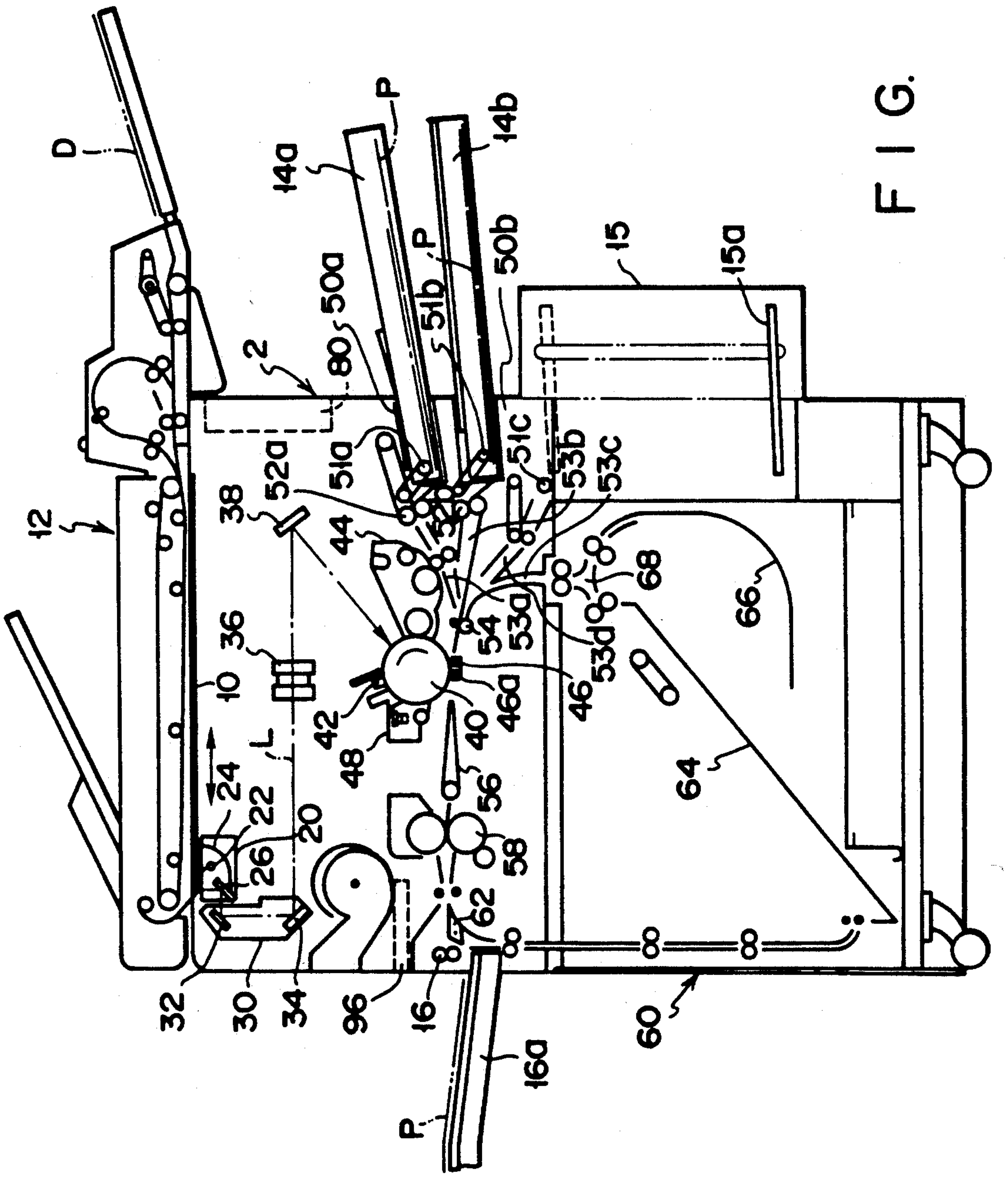
FIG. 2 is a sectional side view of the copying machine according to the present invention.

As is illustrated in FIG. 2, the copying machine 2 further includes a document table 10 and a document feeder 12 (i.e., return auto document feeder hereinafter called "RADF"). The document table 10 supports a document D from which copies are to be made. The RADF 12 is mounted on the table 10 and hinged to one side thereof, and can therefore be moved between a closed position and an opened position. It is designed to feed the document D from a tray onto the document table 10.

Two carriages 20 and 30 are located below the document table 10. The first carriage 20 is connected to a pulse motor (not shown) by a toothed belt or a wire, and is moved back and forth, in parallel to the document table 10, when driven by the pulse motor. The carriage has the lamp 22, a reflector 24, and a primary mirror 26. The lamp 22 illuminates the document D mounted on the document table 10. The reflector 24 reflects and focuses the light emitted from the lamp 22, and supplies the light to the document D. The primary mirror 26 receives the light beam L reflected from the document D and reflects it to the second carriage 30.

The second carriage 30 is connected to the toothed belt or the wire for driving the first carriage 20. Hence, it is moved when the first carriage 20 is driven, in the same direction as the first carriage 20 and at substantially half the speed which the first carriage 20 moves. The second carriage 30 has a secondary mirror 32 and a tertiary mirror 34. The secondary mirror 32 reflects the light beam L from the primary mirror 2 and supplies it to the tertiary mirror 34. The tertiary mirror 34 reflects the light beam L and supplies it to a lens 36.

Both the first carriage 20 and the second carriage 30 extend in a first direction. The first direction is at a right angle to a second direction in which both carriages are moved. Hereinafter, the first direction and the second direction will be referred to as "main scanning direction" and "sub-scanning direction," respectively.

A lens 36 and a holding mirror 38 are located below the first carriage 20 and on the axis of the horizontal light beam L reflected by the tertiary mirror 34. The lens 36 can be moved by drive means (not shown) back and forth along the axis of the horizontal light beam L, thereby to focus the beam L and to magnify or reduce the image of the document 10. The folding mirror 38 can be moved, too, by a drive mechanism (not shown) along the axis of the horizontal light beam L, thereby to correct the fluctuation of the focal length of the lens 36, which as been caused by the motion of the lens 36. The mirror 38 reflects the light beam L and supplies it to the photoconductor 40, thereby to form an electrostatic latent image on the photoconductor 40. The electrostatic latent image is a charge-distribution pattern representing the characters and graphics printed on the document D mounted on the document table 10.

The photoconductor 40 is located below the folding mirror 38, or in the middle within the housing of the copying machine 2. A main charging device 42, a developing device 44, a transferring unit 46, and a cleaning unit 48 are arranged around the photoconductor 40. The main charging device 42 applies a predetermined electric charge to the photoconductor 40. The developing device 44 applies toner to the photoconductor 40, in order to convert the latent image to a visible image or a toner image. The transferring unit 46 is designed to transfer the toner image from the photoconductor 40 onto a sheet of paper P which has been supplied by means of a material delivering system (later described). The unit 46 has an AC charge generating-section 46*a* for releasing the paper P from the photoconductor 40 after the toner image has been transferred to the paper P. The cleaning unit 48 electrically discharges the photoconductor 40, thereby to change the charge-distribution pattern back to an initial one, and also scrape the residual toner from the photoconductor 40.

The copying machine 2 has two slots 50*a* and 50*b* in the front side. Paper cassettes 14*a* and 14*b* are partly inserted into these slots 50*a* and 50*b*, respectively. Either cassette contains a stack of plain paper sheets P or OHP sheets P. Note that the machine 2 has in addition to the cassettes 14*a* and 14*b* a large capacity feeder (hereinafter referred to as LCF) 15 which is capable of holding a large number of paper sheets P. Since the LCF 15 can hold 500 through 2,500 paper shuts P, it has a paper deck 15*a* which moves up and down in accordance with the amount of paper sheets P remaining in the LCF 15.

In the housing of the machine 2, three feed-rollers 51*a*, 51*b* and 51*c*, three pairs of transporting rollers 52*a*, 52*b* and 52*c*, four paper-feeding paths 53*a*, 53*b*, 53*c* and 53*d* and a pair of timing rollers 54 are arranged between the slots 50*a* and 50*b* (cassettes 14*a* and 14*b*), on the one hand, and the photoconductor 40, on the other.

The first feed-roller 51*a* contacts the uppermost sheet P in the cassette 14*a*, and feeds this sheet P from the cassette 14*a* toward the photoconductor 40 when it is rotated by a drive means (not shown). Similarly, the second feed-roller 51*b* contacts the uppermost sheet P in the cassette 14*b*, and feeds this sheet P from the cassette 14*b* toward the photoconductor 40 when it is rotated by a drive means (not shown, either).

The first pair of transporting rollers 52*a* are located between the first feed-roller 51*a* and the paper-feeding path 53*a*. They transport the sheet P from the first feed-roller 51 toward the photoconductor 40. The second transporting rollers 52*b* are located between the second feed-rollers 51*b* and the paper-feeding path 53*b*. The rollers 52*b* transport the sheet P from the second feed-roller 51*b*, also.

Each of paper-feeding paths 53*a*, 53*b*, 53*c* and 53*d* has a pair of guide plates. The first path 53*a* guides the sheet P from the first transporting rollers 52*a* toward the photoconductor 40. The second path 53*b* guides the sheet P from the second transporting rollers 52*b* toward the photoconductor 40. The third path 53*c* guides a copied sheet P toward the photoconductor 40, said copied sheet P having been fed from the photoconductor 40 through a pedestal 60 (later described). The path 53*d* guides a paper P from the LCF 15 toward the photoconductor 40, also.

The timing rollers 54 correct a skew of the sheet P supplied through the first path 53*a*, the second path 53*b*, or the third path 53*c*, such that the leading edge of the sheet P is aligned with the leading edge of the toner image which has been formed on the photoconductor 40 when the sheet P reaches the photoconductor 40. These rollers 54 feed the sheet P to the photoconductor 40 at the same speed as the circumferential speed of the photoconductor 40.

A pair of exit rollers 16, a transporting unit 56, a fixing unit 58, a sorting gate 62 are also arranged within the housing of the copying machine 2. The transporting unit 56 feeds a sheet P, which has the toner image transferred to it electrostatically, from the photoconductor 40 to the fixing unit 58. The fixing unit 58 heats and melts the toner on the sheet P, thereby fixing the image on the sheet P (i.e., to make a hard copy). The exit rollers 16 feed the copied sheet P (or the hard copy) from the housing of the copying machine 2. The sorting gate 62 is located between the exit rollers 16, on the one hand, and the fixing unit 58, for guiding the copied sheet P either toward the exit rollers 16 or into the pedestal 60.

A tray 16*a* is attached to the end portion of the housing of the copying machine 2, for receiving copied sheets P fed by the exit rollers 16 out of the housing.

The pedestal 60 is a box-like component, on which the housing is mounted. The pedestal 60 contains a paper-returning mechanism for feeding copied sheets P supplied from the fixing unit 58 through the sorting gate 62, draw-back to the photoconductor 40, so that another image is formed on the reverse side of each copied sheet P or superimposed on the image already formed on the sheet P. The paper-returning mechanism has a paper-feeding path 64, a paper-reversing guide 66, and a selecting-gate 68. The path 64 guides a copied sheet P toward the third path 53*c*. The guide 66 is located at the exit end of the paper-feeding path 64, and turns the sheet P upside down so that an image can be formed on the reverse side of the sheet P. The selecting-gate 68 guides the copied sheet P to either the third path 53*d* or the paper-reversing guide 66.

Figure 3:
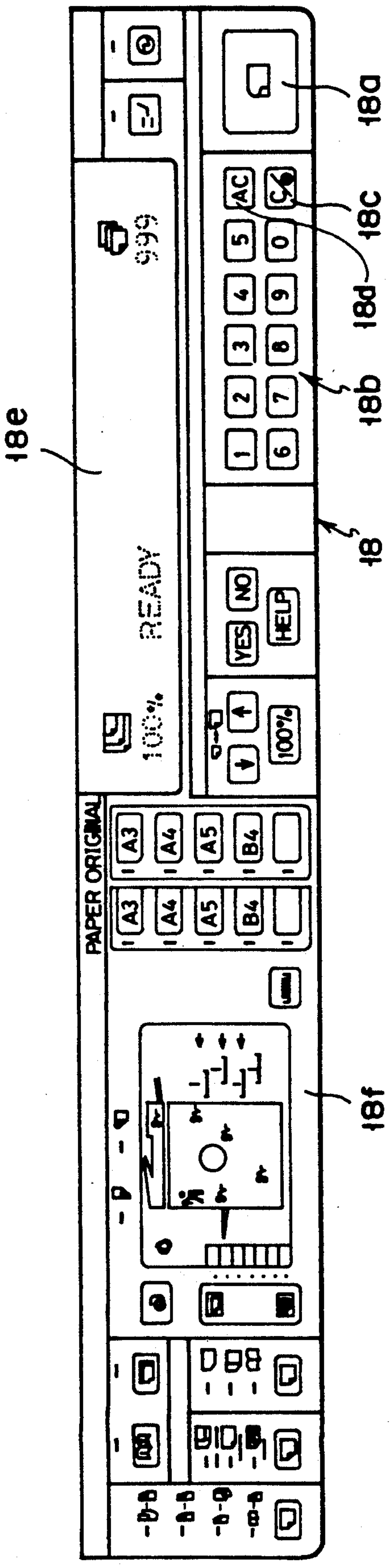
FIG. 3 is a plan view of the control panel of the copying machine according to the present invention.

The control panel, i.e., setting means 18 is mounted on the cover (not shown) which surrounds the document table 10. As is shown in FIG. 3, the panel 18 includes various keys Among these keys are: a print key 18*a*, a numeral key pad 18*b*, a clear key 18*c*, and all-clear key 18*d*. When depressed, the print key 18*a* generates a print-starting signal. When selectively pushed, the keys of the numeral key pad 18*b* generate data representing a desired number of copies to make, or other kinds of data. When operated, the clear key 18*c* generates a print-stopping signal or cancel any data input by operating the numeral key pad 18*b*. When depressed, the all-clear key 18*d* generates a signal for stopping all operations of the copying machine 2 and for canceling all copying modes, set by operating the panel 18, back to the copying modes initially set by the manufacturer.

The control panel 18 further includes a liquid-crystal display (LCD) 18*e* and a monitor LED display 18*f*. The LCD 18*e* is designed to display various items of input data (e.g., the desired number of copies, the copy magnification, both set by the operator), and also various messages (e.g., instructions to the operator, the timing of replenishing paper and toner, and error messages). The monitor LED display 18*f* is designed to display what condition the machine 2 is in, which cassette has been selected, and where paper-jamming, if any, is occurring.

Figure 4:
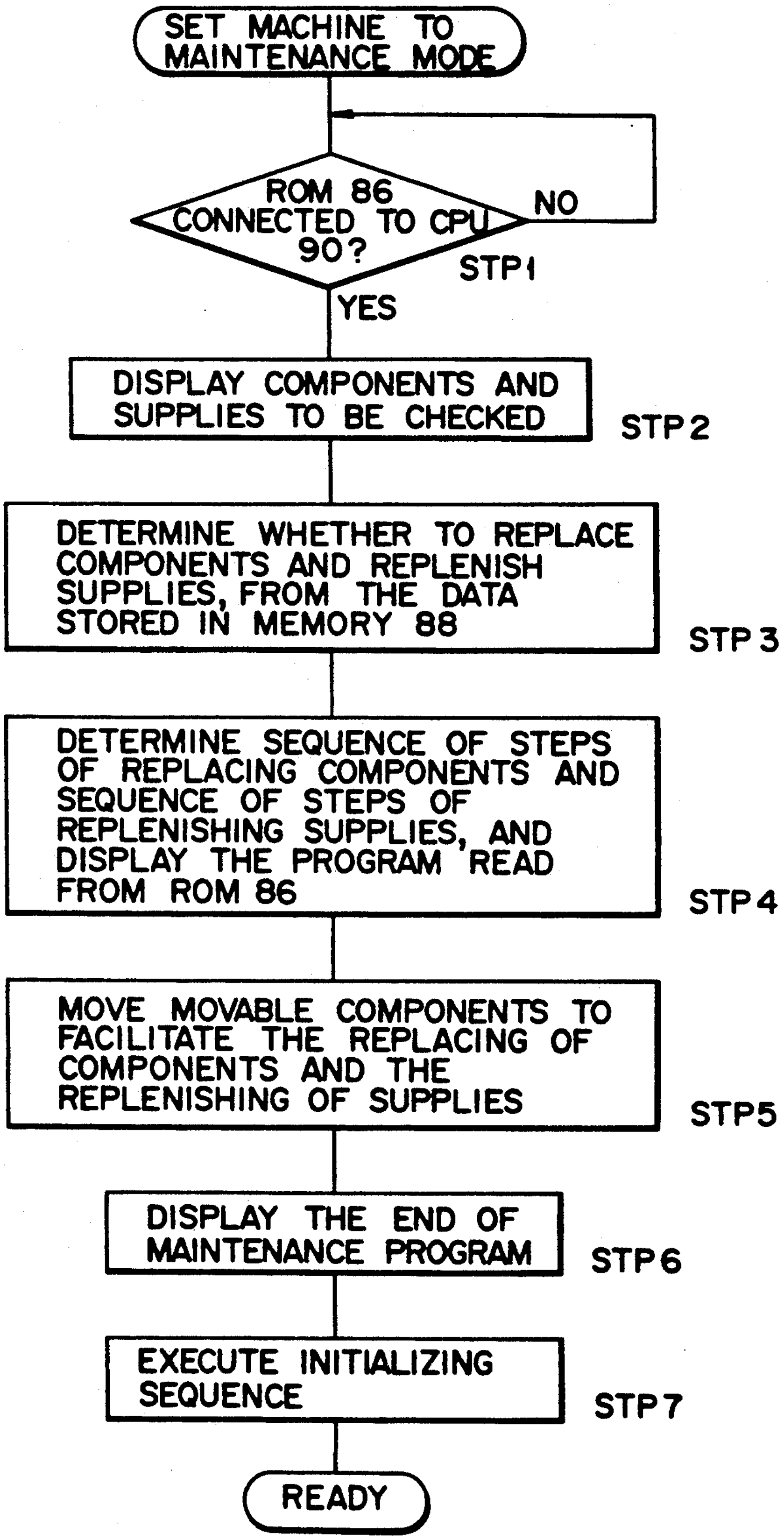
FIG. 4 is a flow chart explaining a maintenance program applied to the copying machine.

With reference to FIG. 4, a checking operation in accordance with the maintenance program stored in the outer ROM 86 is explained.

The maintenance program is read from the outer ROM 86 to the CPU 90 when the copying machine 2 is set to maintenance mode. More precisely, when the machine 2 is set to the maintenance mode, it is determined in step STP1 whether or not the outer ROM 86 has been connected to the CPU 90. If YES in step STP1, the LCD 18*e* displays, in step STP2, the components and supplies which need to be checked. In step STP3, it is determined whether or not specific components should be replaced with new ones, and whether or not the supplies (i.e., toner and paper) should be replenished, from the data which is stored in the nonvolatile memory 88 and represents the period of time passed since the previous replacement of the components and the previous replenishing of the supplies. If YES in step STP3, the operation goes to step STP4. In step STP4, the program, showing the sequence of steps of replacing the components and also the sequence of steps of replenishing the supplies, is read from the outer ROM 86 to the CPU 90. Also in step STP4, the LCD 18e displays both sequences of steps. When the data which the LCD 18e is to display is large, that is, when many components and much supplies need to be replaced and replenished, part of the program read from the outer ROM 86 is temporarily stored into a buffer memory (not shown). In step STP5, the CPU 90 drives the motors (not shown), thereby moving movable components from the positions where they obstruct the replacing of the components and the replenishing of the supplies. For example, if the photoconductor 40 is replaced, the developing device 44 which contacts the photoconductor 40 is released. If the rollers 51c are replaced, the paper deck 15a moves down to the position indicated by a solid line in FIG. 2. When the serviceman has finished replacing the components and replenishing the supplies, the LCD 18e displays the message showing that the maintenance program has been executed, in step STP6. When the serviceman erases the data in the nonvolatile memory 88, the copying machine 2 is released from the maintenance mode. Then, in step STP7, the machine 2 performs the initializing sequence represented by the data stored in the ROM 84.

The machine 2 is set to the maintenance mode, either by pushing the print key 18a while any two keys of the pad 18b, e.g., "0" and "5" are kept depressed, or by turning off and on a power switch (not shown) while any two keys of the pad 18b are kept depressed.

Figure 5A:
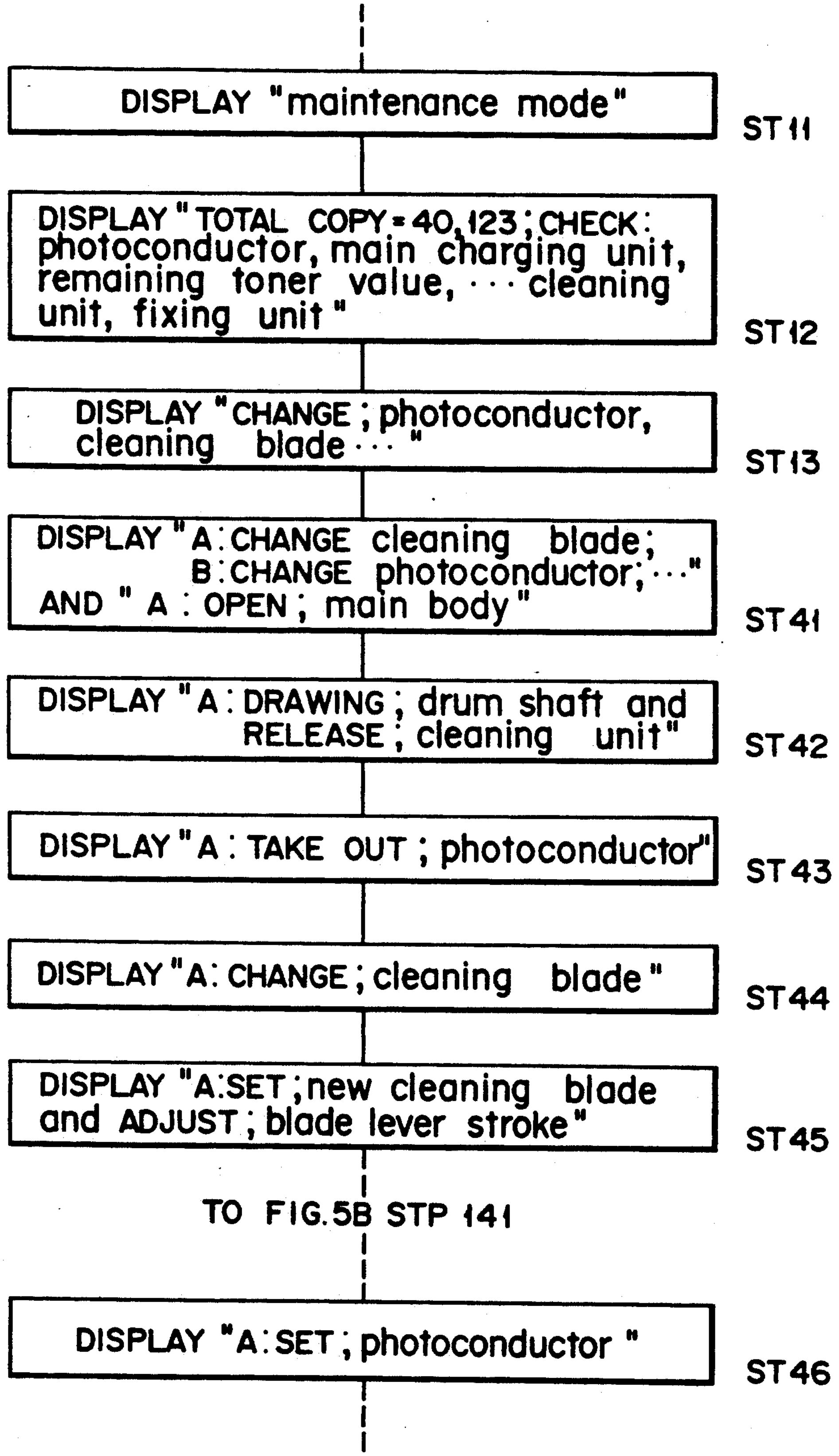
FIGS. 5A and 5B are a flow chart explaining a detailed maintenance program applied to the copying machine, instructing a serviceman to change some of the components, for example, a photoconductor and a cleaning blade.
Figure 5B:
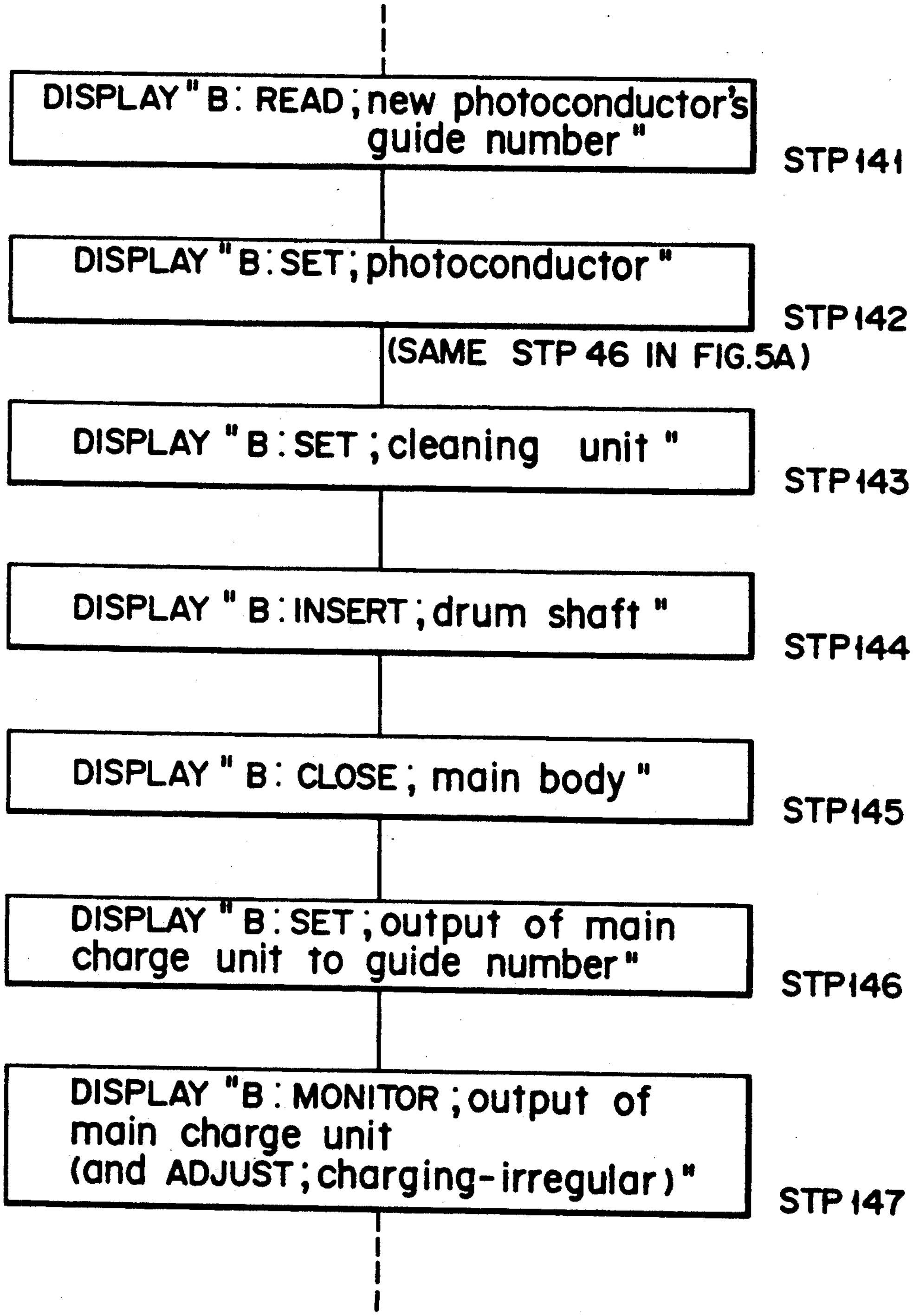

With reference to the flow chart of FIGS. 5A and 5B, it will now be explained how the LCD 18e displays instructions for replacing some of the components with new ones, when the machine 2 is set to the maintenance mode.

Here it is assumed that the photoconductor 40 has scratches on its surface, and that the blade (not shown) of the cleaning unit 48 has been damaged. It starts operating in accordance with the maintenance program stored in the outer ROM 86 as has been explained with reference to the flow chart of FIG. 4.

When it is detected that the outer ROM 86 is connected to the CPU 90, the LCD 18e displays the words "maintenance mode" in step STP11 (identical to step STP1 in FIG. 4). Then, the LCD 18e displays the instruction "TOTAL COPY"=40,123, CHECK: photoconductor, main charging unit, remaining tonor value cleaning unit, fixing unit step STP 12 (identical to step STP2 in FIG. 4). Next, the LCD 18e displays the instruction "CHANGE; photoconductor, cleaning blade"... in step STP13 (identical to step STP3 in FIG. 4). Then, in step STP41, the LCD 18e displays the instructions "A: CHANGE cleaning blade; B: CHANGE photoconductor". . . , and also the instruction "A: OPEN; main body." In step STP42, the LCD 18e displays the instructions "A: DRAWING; drum shaft, RELEASE; cleaning unit." Further, in step STP43, the LCD 18e displays the instruction "A: TAKE OUT; photoconductor." In step STP44, the LCD 18e displays the instruction "A: CHANGE; cleaning blade." In step STP45, the LCD 18e displays the instruction "A: SET; new cleaning blade", and "ADJUST; blade lever stroke."

If only the blade needed to be replaced, the LCD 18e would display the instructions "A: SET; photoconductor" in step STP46, and the CPU 90 would execute programs to set the machine 2 to the copy mode.

In the present instance, the photoconductor 40 as well as the blade must be replaced. Hence, as is shown in FIG. 5B, the LCD 18e displays the instruction "B: READ; new photoconductor is guide number" in step STP141, the instruction "B: SET; photoconductor" in step STP142, and the instruction "B: SET; cleaning unit" in step STP143. Further, the LCD 18e displays the instruction "B: INSERT; drum shaft" in step STP144, the instruction "B: CLOSE; main body" in step STP145, the instruction "B: SET; output of main charge unit to guide number of the photoconductor" in step STP146, and the instruction "B: MONITOR; output of main charge unit (and ADJUST; charging-irregular" in step STP147.

Before steps STP41 to 46 and steps STP141 to 147 are carried out, both carriages 20 and 30 are moved by means of a pulse motor (not shown) to predetermined standby positions, the developing device 44 is released out from the photoconductor 40, and all are electrically locked thereat so that they may not be moved even when accessed by opening the housing. At the same time, the heater lamp is turned off. Also, the power supply to all components but the control panel 18 and the control unit 80 is stopped in step STP15 (not shown) identical to step STP5 (FIG. 4). Thus, the machine 2 does not operate while the serviceman is performing maintenance work.

Upon completion of step STP147, the LCD 18e displays the message showing that the maintenance program has been executed, in step STP16 (now shown) identical to step STP6 (FIG. 4). When finishing the maintenance work, the serviceman operates the control panel 18, releasing the copying machine 2 from the maintenance mode, in step STP17 (now shown) identical to step STP7 (FIG. 4). As a result, the machine 2 is automatically set to the copy mode, so that it can perform the initializing sequence in accordance with the program stored in the ROM 84.

It will now be explained how the machine 2 performs copying operation.

The document D supplied by the RADF 12 is mounted on the document table 10. Thereafter, the operator operates the control panel 18, thereby inputting various items of copying conditions, such as the desired number of copies and the copy magnification. Then, the lamp 22 is turned on, and the reflector 24 reflects the light emitted from the lamp 22, illuminating the document D. (It should be noted that the lamp 22 emits light only while the first carriage 20 is being moved forward in the sub-scanning direction to scan the document D.)

The light reflected from the document D is applied to the primary mirror 26. The primary mirror 26 reflects the light to the secondary mirror 32 of the second carriage 30. The secondary mirror 32 reflects the light at the angle of 90° and applies it to the tertiary mirror 34. The tertiary mirror 34 reflects the light, also at the angle of 90°, and applies it to the lens 36 located at such a position that it can magnify or reduce the image of the document 10 at the desired ratio set by the operator. The light from the lens 36 is reflected by the folding mirror 38 and supplied to that surface of the photoconductor 40 which has been electrically charged. As a result, the image of the document 10 is recorded on the photoconductor 40, in the form of an electrostatic latent image, i.e., a specific distribution of electrostatic charge.

As the first carriage 20 and the second carriage 30 are moved at the predetermined speed in the sub-scanning direction, the light reflected from the document D is continuously applied to the photoconductor 40. Hence, the whole image on the document D is recorded, in the form of a latent image, on the photoconductor 40. Unless the magnification set by the operator is 100%, the speed of the pulse motor (not shown) is changed in accordance with the magnification, to move both carriages 20 and 30 in the sub-scanning direction.

As the photoconductor 40 is rotated, the latent image is moved toward an area to contact with the developing device 44. The device 44 applies toner onto the surface of the photoconductor 40, thus developing the latent image into a visible image or a toner image.

In the meantime, the cassette 14*a* or the cassette 14*b* is selected in accordance with the size of the document D mounted on the document table 10 and the magnification set by the operator. A drive device (not shown) drives the feed-roller 51*a* or 51*b*, whereby the uppermost sheet P in the selected cassette is supplied to the image-transfer region provided between the photoconductor 40 and the transferring unit 46. More precisely, the sheet P drawn from the cassette 14*a* or 14*b* is fed forward by the transporting rollers 52*a* or 52*b* and guided through the path 53*a* or 53*b* to the image-transfer region. The timing rollers 54 stop the sheet P temporarily, correcting the skew of the sheet P, such that the leading edge of the sheet P is aligned with the leading edge of the image formed on the photoconductor 40 when the sheet P reaches the photoconductor 40. Then, the rollers 54 feed the sheet P to the photoconductor 40 at the same speed as the circumferential speed of the photoconductor 40.

The sheet P, now with its leading edge aligned with the leading edge of the image, is attracted onto the photoconductor 40 due to the residual electrostatic charge thereon. As the photoconductor 40 rotates, the sheet P passes through the image-transfer region. At this time, the transferring unit 46 applies an electric charge to the photoconducto: 40, which is of the same polarity as the charge applied to the photoconductor 40 for forming the latent image. As a result, the toner is attracted from the photoconductor 40 onto the sheet P, whereby the toner image is transferred to the sheet P. As a same time, an AC voltage is generated from the AC charge generating section 46*a* to the sheet P. The sheet P is thereby released from the photoconductor 40. The transporting unit 56 feeds the sheet from the photoconductor 40 to the fixing unit 58. The fixing unit 58 has been heated to a temperature high enough to melt the toner. Hence, the toner on the sheet P, melts, partly soaking into the sheet P and partly remaining on the sheet P.

The sheet P, with the image of the document D formed on it, is fed onto the tray 16*a*, with its copied side turned up.

If the copying machine 2 is set to double-sided copying mode or multi-staged copying mode, the sheet P is returned to the pedestal 60 through the sorting gate 62. In the pedestal 60, the sheet P is turned upside down, or rotated by 180°, and is guided to the timing rollers 54 through the third paper-feeding path 53*c*, so that another image is formed on it.

After each toner image has been transferred from the photoconductor 40 onto a sheet P of paper, the cleaning unit 48 removes the residual toner from the photoconductor 40 as the photoconductor 40 is further rotated. Then, a discharging lamp (not shown) is turned on, thus electrically discharging the photoconductor 40. As a result, the charge-distribution pattern on the photoconductor 40 is changed back to an initial pattern. This, the photoconductor 40 is thus made ready for forming another image.

Additional advantages and modification will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus, comprising:

(a) means for forming an image on an image bearing member, said forming means including a plurality of movable components;

(b) a means for storing data including (1) a condition required for operating the forming means so as to perform an image formation, (2) a parameter used to check a time for maintenance of the forming means, (3) a first data item indicating a part of the forming means which should be subjected to maintenance in the case where the time for maintenance is checked, and (4) a procedure for maintenance of the image forming means;

(c) means for controlling the forming means in accordance with at least one of the data of the storing means to move the movable components in the vicinity of the part of the forming means which should be subjected to maintenance; and (d) means for setting the forming means in a maintenance mode in which the forming means is checked in accordance with the parameter stored in the storing means.

2. The apparatus according to claim 1, wherein the movable components include at least one of a developing device, a paper deck and a cleaning blade of a cleaning unit.

3. An image forming apparatus comprising:

(a) means for inputting operational data;

(b) means for reading information recorded on an original;

(c) means for supplying recording material;

(d) means for forming an image corresponding to the information coding recording material;

(e) first memory means for storing maintenance data representing maintenance items which are formed on said image forming means when the apparatus is set in a maintenance mode;

(f) second memory means for storing data to control said image forming means;

(g) means for displaying the information stored by the storing means when the image forming means is set to said maintenance mode; and (h) means for controlling said image forming means in accordance with the data stored in said second memory means, said control means causing said display means to display the data stored in said first memory means, when the apparatus is set in the maintenance mode by operating said input means, to select at least one of the components of said image forming means, which needs to be replaced by a new one, in accordance with the data stored in said first memory means, and to lock the selected component at a desired position and disconnect said material supplying means from said image forming means to facilitate replacing of the selected component.

4. An image forming apparatus, comprising:

(a) means for forming an image on an image bearing member including (1) a paper feeding mechanism for feeding paper sheets used to output the image formed on the image bearing member as a hard copy, and (2) paper sheet storing means being movable toward and away from the paper feeding mechanism, for storing paper sheets to be fed by the paper feeding mechanism;

(b) means for storing data including (1) a condition required for operating the forming means so as to perform an image formation, (2) a parameter used to check a time for maintenance of the forming means, (3) a first data item indicating a part of the forming means which should be subjected to maintenance in the case where the time for maintenance is checked, and (4) a procedure for maintenance of said part of the image forming means;

(c) means for controlling the forming means in accordance with at least one of the data of the storing means; and (d) means for setting the forming means in a maintenance in which the forming means is checked in accordance with the parameter stored in the storing means.

5. The apparatus according to claim 4, wherein the forming means includes a plurality of movable components.

6. The apparatus according to claim 5, wherein the movable components include at least one of a developing device, a paper deck and a cleaning blade of a cleaning unit.

7. The apparatus according to claim 5, wherein the controlling means moves the movable components in the vicinity of the part of the forming means which should be subjected to maintenance.

* * * * *